Oct. 4, 1955   E. C. GROVES   2,719,550
LEVELING OFF SWING CUT-OFF SAW
Filed Feb. 9, 1954   3 Sheets-Sheet 1

E. C. GROVES   INVENTOR
BY C. A. Snow & Co.
ATTORNEYS.

Oct. 4, 1955

E. C. GROVES 2,719,550

LEVELING OFF SWING CUT-OFF SAW

Filed Feb. 9, 1954

E. C. GROVES   INVENTOR

BY *C. A. Snow & Co.*

ATTORNEYS.

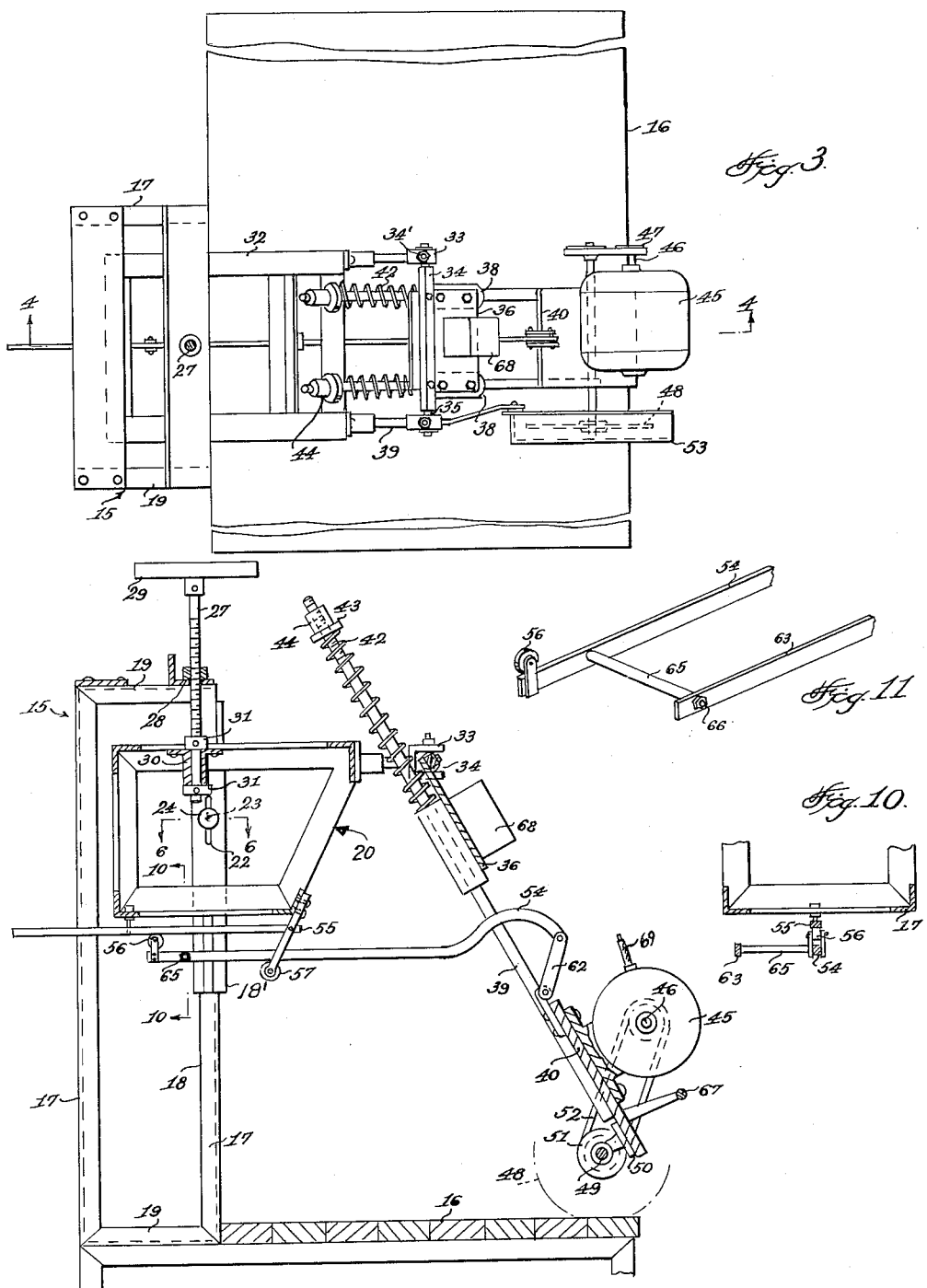

2,719,550

LEVELING OFF SWING CUT-OFF SAW

Earl C. Groves, Monett, Mo.; E. L. Monroe, administrator of the estate of said Groves, deceased Application February 9, 1954, Serial No. 409,155

5 Claims. (Cl. 143—46)

This invention relates to a cut off saw support and more particularly to a cut off saw swingably and slidably mounted on a work bench with a saw guard also swingably and slidably mounted on the saw mount to act as a guard for the saw in all positions of the movement of the saw.

It is an object of this invention to provide a leveling off swing cut off saw of the kind to be more particularly described hereinafter so mounted and supported on a saw table for manual movement both swingably on a piece of work and slidable relative to the work bench to perform a cut off sawing operation on the work, there being a saw guard rotatably mounted on the saw blade shaft and held in its proper position relative to the saw blade and saw table in all of the swinging positions of the saw.

It is another object of this invention to provide a leveling off swing cut off saw of this kind having a guide for the swingably mounted saw and a guard for the saw movable into a constant position relative to the saw as the saw is swung for proper sawing operation.

It is a further object of this invention to provide a leveling off swing cut off saw of this kind having a rotating saw blade slidably mounted for constant level positioning, the slidable mounting of the saw being compensated for by coil springs or the like to steady the saw and its motor in all positions.

Other and further objects and advantages of the invention will be hereinafter described and the novel features thereof defined in the appended claims.

In the drawings:

Fig. 3 is an enlarged fragmentary plan view, partly broken away.

Fig. 4 is a transverse section taken on the line 4—4 of Fig. 3.

Fig. 10 (Sheet 3) is a transverse section, party broken away, taken on the line 10—10 of Fig. 4.

Fig. 11 is a perspective view, partly broken away, of the saw and saw guard guide bars removed from the assembly.

Figure 1:
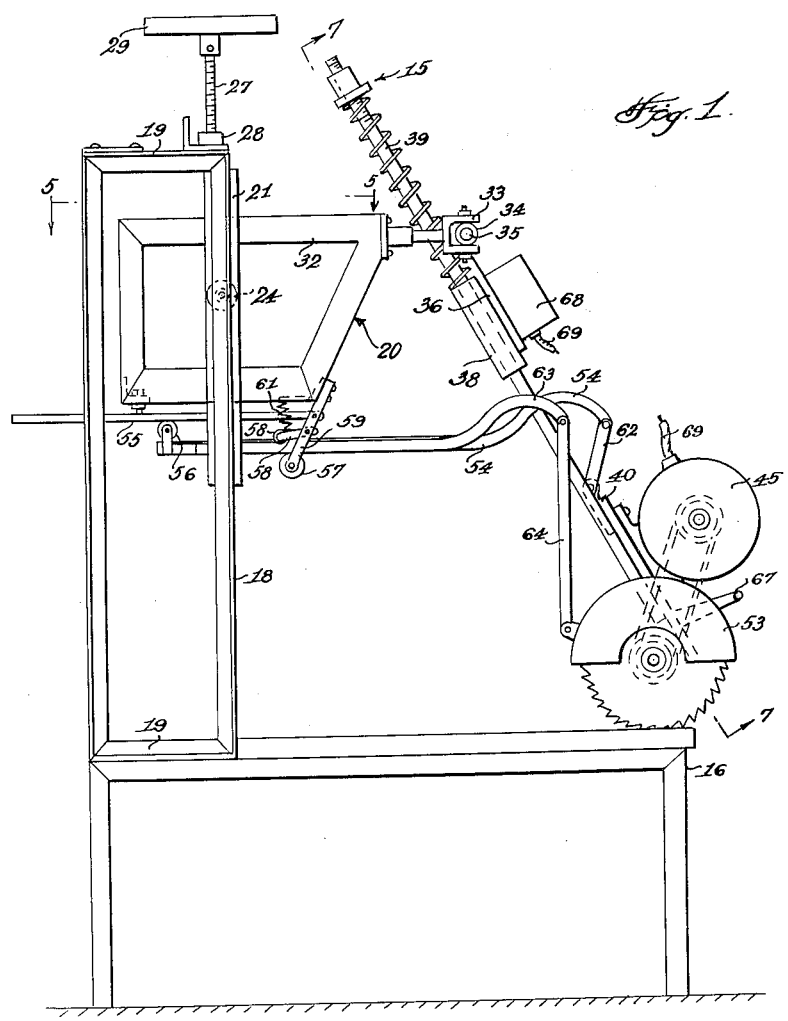
Fig. 1 is a side elevation of a leveling swinging cut off saw constructed according to an embodiment of my invention.
Figure 5:
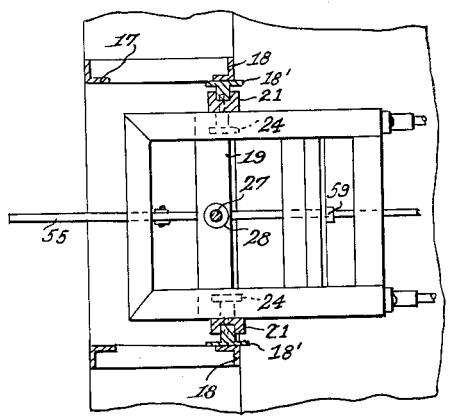
Fig. 5 (Sheet 1) is a transverse cross section taken on the line 5—5 of Fig. 1.
Figure 2:
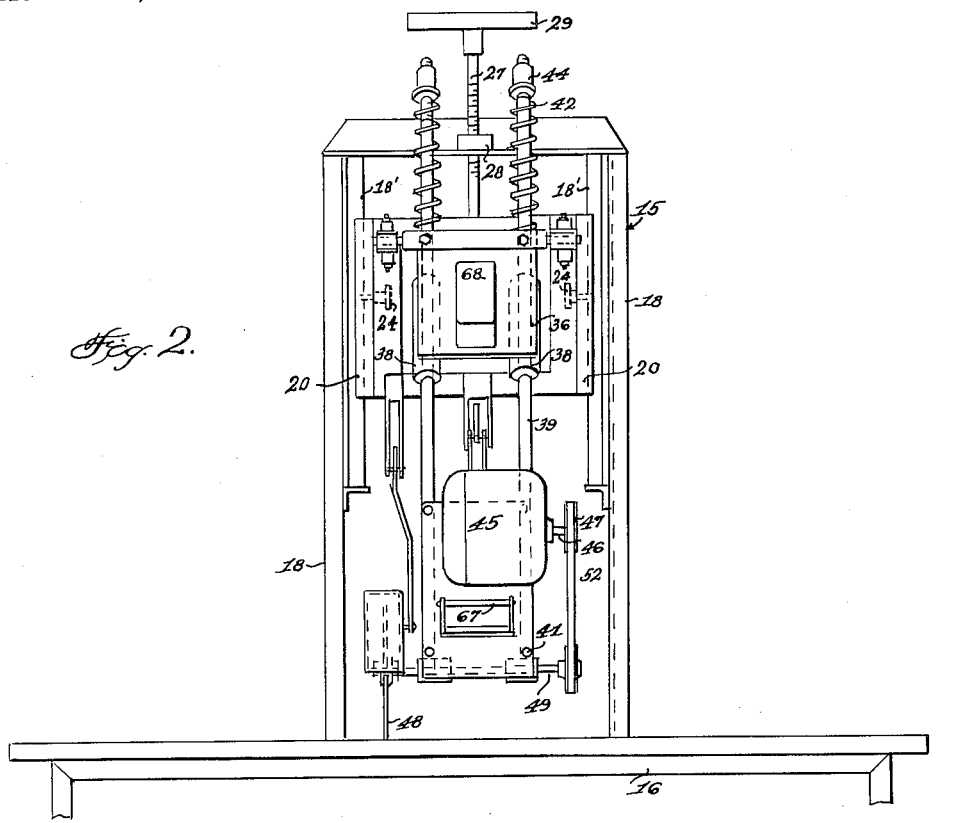
Fig. 2 is a front elevation.

Referring more particularly to the drawings the numeral 15 designates generally a level cut off saw mechanism constructed according to an embodiment of my invention mounted on a saw bench 16 as clearly indicated in Figs. 1 and 2 of the drawings.

An outer fixed frame 17 is mounted at its lower end on the top surface of the bench 16 being provided with vertically extending substantially L-shaped arms 18 and horizontal connecting bars 19 connecting the vertical arms 18 together above the bench 16.

Figure 6:
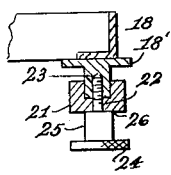
Fig. 6 is a fragmentary detailed section taken on the line 6—6 of Fig. 4.

An inner movable frame 20 is slidably mounted within the outer fixed frame 17 the slidable frame 20 being provided with U shaped vertical arms 21, the side arms of the slidable frame being provided with vertically extending slots 22, Fig. 4, therethrough through which a screw 23 is slidably engaged being threadably engageable at its threaded end in one of the vertical frames 18 or preferably on the center arm of the T shaped arm 18′ (Fig. 6) of the outer fixed frame 17.

A head 24 is provided on one end of the horizontal screw 23 as a finger grip for clamping the slidable frame 20 in a selected position relative to the fixed frame 17. A sleeve 25 is formed integral with the head 24 so that the inner side or end of the sleeve 25 will provide a shoulder 26 engageable with the slidable U shaped vertical side arms of the slidable frame 20 as clearly shown in Fig. 6 of the drawings.

The slidable inner frame 20 is caused to move vertically relative to the outer fixed frame 17 by means of a screw 27 which is rotatably engaged at its lower end with one of the horizontal arms of the inner slidable frame 20 and threadably engaged in a nut 28 which is carried by the upper end of the fixed frame 17. A hand wheel 29 is fixed to the extreme upper end of the vertically extending screw 27 for rotatably actuating the screw for the raising and or lowering of the slidable inner frame 20.

The extreme lower end of the screw 27 is provided with a sleeve 30, Fig. 4, which rotatably engages the lower end of the screw 27 and is fixed to the slidable frame 20 there being a washer 31 which is carried by the screw 27 on the opposite ends of the sleeve 30 so that the screw 23 is rotatable relative to the sleeve 30 and the slidable frame.

Carried intermediate the length of the frontmost of the horizontal bars of the sliding frame there are connected two yokes 33, U-shaped in configuration, for holding on opposite sides transverse pivot tubes 34. The yokes 33 engage the tubes 34 by short screws 34′, Fig. 8, through the walls of the tubes. A shaft 35 is journaled in the tubes 34 for oscillation therein and is secured to the upper side of the plate 36 which may be swung horizontally relative to the fixed frame 17 during the process or operation of cutting a piece of work by the level cut off saw mechanism 15.

Figures 7, 8, 9:
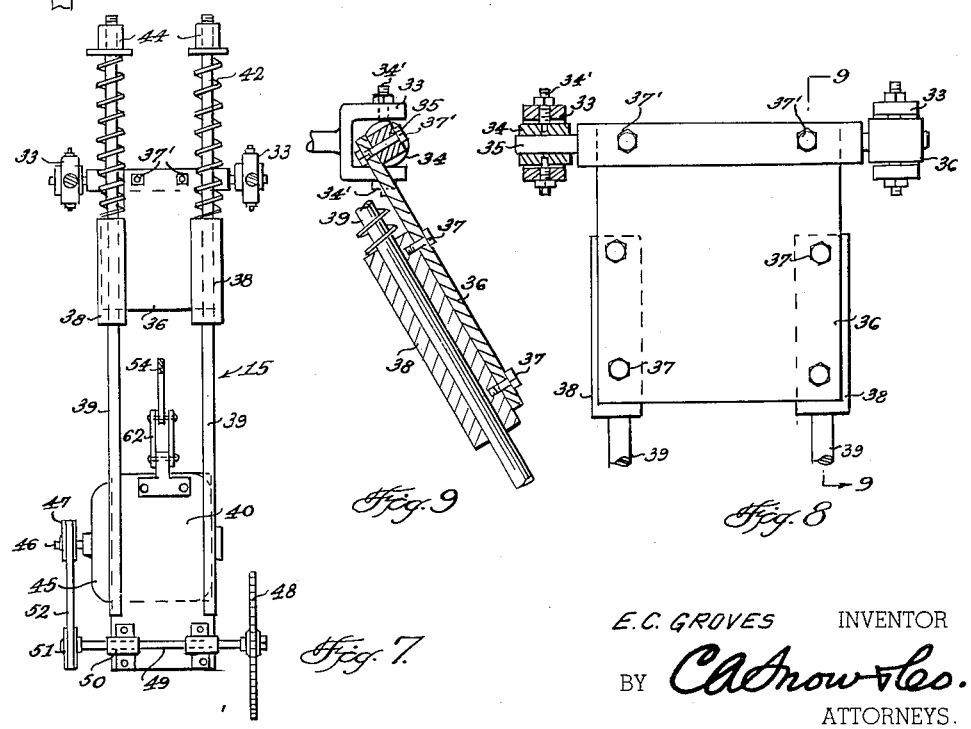
Fig. 7 (Sheet 2) is a vertical detailed section taken on the line 7—7 of Fig. 1.
Fig. 8 is an enlarged plan view, partly broken away, of the sliding pivot connection.
Fig. 9 is a transverse detailed section taken on the line 9—9 of Fig. 8.

On the rear side of the plate 36 there is provided a pair of horizontally spaced apart vertically open tubes 38 which are secured to the plate 36 by the screws 37 which engage through a wall of each of the tubes 38. The plate 36 at its top is attached to the shaft 35 by the longer screws 37′ as shown in Figs. 8 and 9.

Upwardly extending rods 39 are journaled in the tubes 38 for longitudinal sliding movement; the lower ends of the rods 39 are attached to and support the motor stand 40 by the bolts 41 Fig. 2.

The connection of the motor stand 40 to the lower end of the rods 39 provide for the sliding movement of the stand 40 up or down relative to the upper plate 36.

A coil spring 42 is engaged about each upper end of each of the rods 39 above the tubes 38 with a washer 43, Fig. 4, at the extreme upper end of each of the rods 39 secured thereon by a nut 44 which is threadably engaged on each of the rods. One end of each spring 42 is engaged on the lower side of a washer 43 with the other end of the spring engaging the upper end of the tube 38. The springs thus act as compensating springs for the weight of the motor plate and rod assembly as it is moved in use.

An electric motor 45 is bolted to or otherwise fixed on the motor stand or plate 40, the motor 45 having a pulley 47 secured to the rotor shaft 46 outwardly from the motor casing 45 as clearly shown in Fig. 2 of the drawings.

A saw 48 is driven by the motor 45 and spaced adjacent to the motor, the saw 48 being fixed to a saw shaft 49 which is journaled in bearings 50 with the saw 48 on one end and a pulley 51 on the other end. A belt 52 passes over the pulleys 51 and 47 for rotating the saw.

A saw guard 53 is positioned about the upper half of the rotatable saw 48, the saw guard 53 being of conventional configuration and having journalled on the saw shaft 49, with the lower side open as shown in Fig. 1 of the drawings.

A first saw leveling arm 54 is slidable along the length of a fixed track element 55 which is carried by the inner fixed frame 20 intermediate the sides thereof. A roller 56 is rotatably carried by the inner end of the guide arm 54 for bearing engagement with one side of the track 55. The other end of the arm 54 is linked to the motor stand 40.

A second guide roller 57 is carried by the movable frame 20 for rotatably engaging the under side of the guide arm 54, the roller 57 being carried by a depending arm 59, Fig. 1, which is fixed to the motor side of the movable frame.

A link 62 is connected at one end thereof to the motor end of the leveling arm 54 and at the other end to the motor stand 40 so that the motor 45 may be continually supported for transverse horizontal movement relative to the work bench 16.

A second slidable guide arm, designated generally by the reference numeral 63 in the drawings is connected by a link 64 at an end of the arm to the saw guard 53.

A short arm 58 with roller mounted thereon is pivoted to support 59 and pressed downwardly by spring 61 against the top of guide arm 63, so that it slides between rollers 58 and 57.

As the motor is moved transversely of the bench 16 the saw guard 53 is moved accordingly so that the second arm 63 and the first arm 54 are moved at the same time in the same direction.

A tubular spacer 65, Fig. 11, is mounted on a through bolt 66 which connects both of the arms together near their ends adjacent to the fixed frame so that the arms 54 and 63 move together according to the motion of the motor and saw through a handle 67.

A switch box 68 is secured to the outer side of the upper plate 36 being connected to the motor 45 by an elongated "BX" cable 69 so that the saw may be actuated by a person standing adjacent to the bench 16 for the operation of the level cut off swing saw 15 described above.

*Use and Operation*

In the use and operation of the level cut off swing saw 15, the locking screws 23 are initially loosened so that the sliding frame may be slid vertically relative to the fixed frame for accurately positioning the saw where desired.

The usual adjustment is that seen in Fig. 1 in which the saw just touches the table 16 sufficiently to saw through any work thereon, yet the weight load of the motor, rod and saw assembly is supported by the springs 42 under compression. This adjustment is made by adjusting screw 27 and hand wheel 29 to position the sliding frame 20 and then the locking screws 23 are set up tight to securely hold this position. The saw is now ready for cutting.

A piece of work may then be placed on the bench 16 below the level cut off swing saw 48 and the level cut off swing saw 48 may be moved for the cutting operation. This movement of the saw and the slidable frame member may be accomplished through the use of the handle 67 and the saw placed in cutting operation by the operator selecting a switch on the switch box 68 for actuating the saw. The swing saw may be then swung about the tube 34 on the shaft 35 for cutting the piece of work while the saw guard 53 about the saw 48 is also moved with the motor 45 in all phases of the operation of the saw 48.

While the specific details of one embodiment of this invention have been herein shown and described, the invention is not confined thereto as changes and alterations may be made without departing from the spirit and scope thereof as defined in the appended claims.

I claim:

1. A swing saw mechanism comprising an upstanding support and an upwardly adjustable frame member thereon, carrying horizontally disposed bearings in which are mounted journals fixed to a plate for oscillation through a vertical arc, said plate having two upwardly extending tube bearings in which are slidable two rods, resiliently mounted relative to said tubes, to which are attached a motor and drive connection to a saw mounted on the lower end of the rods, said saw mounting having an articular linkage connection to a leveling arm which is mounted on the frame member for horizontal sliding movement along its axis, said leveling arm and linkage preventing the saw from moving below the adjusted horizontal rectilinear path as the rods swing in a vertical plane in the operation of the saw across the top of a saw bench.

2. The mechanism of claim 1 in which the resilient mounting for the rods comprises a compressible spring on each rod between the tube bearings and a retaining member on the upper end of the rods.

3. The mechanism of claim 2, in which the leveling arm slides on rollers.

4. The mechanism of claim 1, in which the saw is partially enclosed by a guard mounted on the saw shaft and retained in horizontal position by a second leveling arm linkage, slidable in the frame member and attached to the first leveling arm.

5. The mechanism of claim 4 in which the resilient mounting for the rods comprises a compressible spring on each rod between the tube bearings and a retaining member on the upper end of the rods.

References Cited in the file of this patent

UNITED STATES PATENTS

| Number | Name | Date |
|---|---|---|
| 344,066 | Tollner | June 22, 1886 |
| 589,003 | Luther | Aug. 31, 1897 |
| 1,764,965 | Madsen | June 17, 1930 |
| 2,092,181 | Porter | Sept. 7, 1937 |
| 2,302,356 | Taylor | Nov. 17, 1942 |
| 2,320,743 | Nilsen et al. | June 1, 1943 |
| 2,546,277 | Schwandt | Mar. 27, 1951 |
| 2,551,130 | Hunt et al. | May 1, 1951 |

FOREIGN PATENTS

| 691,648 | Germany | June 1, 1940 |